(12) United States Patent
Simiano

(10) Patent No.: US 9,080,788 B2
(45) Date of Patent: Jul. 14, 2015

(54) SOLAR POWER SYSTEM AND METHOD OF OPERATION

(71) Applicant: ALSTOM Technology Ltd, Baden (CH)

(72) Inventor: Marco Simiano, Zurich (CH)

(73) Assignee: ALSTOM Technology Ltd, Baden (CH)

( * ) Notice: Subject to any disclaimer, the term of this patent is extended or adjusted under 35 U.S.C. 154(b) by 195 days.

(21) Appl. No.: 13/857,495

(22) Filed: Apr. 5, 2013

(65) Prior Publication Data

US 2013/0276774 A1  Oct. 24, 2013

(30) Foreign Application Priority Data

Apr. 19, 2012  (EP) .................................. 12164759

(51) Int. Cl.
| | |
|---|---|
| F24J 2/04 | (2006.01) |
| F24J 2/07 | (2006.01) |
| F24J 2/30 | (2006.01) |
| F28D 20/00 | (2006.01) |
| F24J 2/34 | (2006.01) |

(52) U.S. Cl.
CPC ........ *F24J 2/0477* (2013.01); *F24J 2/07* (2013.01); *F24J 2/30* (2013.01); *F24J 2/34* (2013.01); *F28D 20/0034* (2013.01); *F28D 2020/0047* (2013.01); *Y02E 10/41* (2013.01); *Y02E 10/44* (2013.01); *Y02E 60/142* (2013.01); *Y02E 70/30* (2013.01)

(58) Field of Classification Search
CPC .............. F24J 2/30; F24J 2/34; F24J 2/0477; F24J 2/07; F24J 2/04; F24J 2/24; F28D 20/0034; F28D 2020/0047

USPC ......... 60/641.1, 641.8, 641.15; 122/20 R, 35, 122/209.1, 233, 234; 126/617, 634, 638, 126/640, 641, 642, 643, 645, 651, 663, 126/714; 165/48.2, 104.13, 104.14, 104.19, 165/132, 144, 157

See application file for complete search history.

(56) References Cited

U.S. PATENT DOCUMENTS

| | | | | |
|---|---|---|---|---|
| 4,265,223 | A | * | 5/1981 | Miserlis et al. ............... 126/592 |
| 5,417,052 | A | | 5/1995 | Bharathan et al. |
| 6,701,711 | B1 | * | 3/2004 | Litwin ....................... 60/641.11 |
| 2004/0099261 | A1 | | 5/2004 | Litwin |
| 2004/0244376 | A1 | | 12/2004 | Litwin et al. |

(Continued)

FOREIGN PATENT DOCUMENTS

| | | |
|---|---|---|
| CN | 2906462 Y | 5/2007 |
| CN | 101413719 A | 4/2009 |

(Continued)

OTHER PUBLICATIONS

Office action issued from Chinese Patent Office dated Nov. 14, 2014 for CN Application No. 201310137531.0.

*Primary Examiner* — Alissa Tompkins
*Assistant Examiner* — Brian Hill

(57) ABSTRACT

A solar power system, comprising a solar receiver that absorbs solar radiation, at least first and second fluid flow paths passing through the receiver, a first working fluid flowable through the first fluid flow path to absorb thermal energy from the receiver up to a first maximum temperature and a second working fluid flowable through the second fluid path to absorb thermal energy from the receiver up to a second maximum temperature.

16 Claims, 2 Drawing Sheets

(56) References Cited

U.S. PATENT DOCUMENTS

2005/0126170 A1 6/2005 Litwin
2013/0133324 A1* 5/2013 Reynolds .................. 60/641.15

FOREIGN PATENT DOCUMENTS

WO        2011085875 A1      7/2011
WO     WO 2013033200 A2 *   3/2013

* cited by examiner

SOLAR POWER SYSTEM AND METHOD OF OPERATION

TECHNICAL FIELD

The present disclosure relates to solar power systems and methods of operating them. More particularly, the present disclosure relates to solar power systems that utilise a working fluid to transfer thermal energy from a solar receiver to a heat exchanger.

TECHNICAL BACKGROUND

In a known method of concentrated solar power (CSP) generation, radiation from the sun is focused, by such means as parabolic mirrors or heliostats, onto one or more solar radiation receivers that may be mounted, for example, on top of a tower, a so-called "solar tower" arrangement. The or each solar receiver absorbs the solar radiation as thermal energy and a working fluid with a high heat capacity, such as a molten salt, is used to transfer heat from the solar receiver to a heat exchanger in order to generate a further working fluid suitable for driving a prime mover. Typically, the prime mover is a steam turbine operating on the Rankine Cycle, though turbine fluids other than steam can also be used. Normally, the turbine or other prime mover drives an electrical generator for feeding power to a utility grid.

To transfer heat from the solar receiver to the heat exchanger, the working fluid is passed through channels that are in intimate thermal communication with the radiation absorbing elements of the or each receiver, and the fluid is then circulated to the heat exchanger through heavily insulated ducts to avoid excessive heat loss therefrom.

The efficiency of the conversion of solar radiation into useable power is of paramount importance. High efficiency is needed to allow CSP to compete, in terms of cost per unit of energy, against other forms of power generation, such as fossil fuel fired power stations. One aspect of the above CSP systems that has a pronounced effect upon the overall system efficiency is that of the temperature and pressure to which the turbine fluid is raised at the heat exchanger prior to being passed to the turbine. Thermodynamically, it is desirable to heat the fluid to as high a temperature and pressure as possible, so as to maximize the temperature and pressure difference across the turbine. The temperature and pressure achievable for the turbine fluid is, however, limited by the characteristics of the working fluid used to transfer thermal energy from the solar receiver to the heat exchanger. An example of a typical working fluid for CSP systems is a molten salt: a combination of 60% sodium nitrate and 40% potassium nitrate. This combination of sodium and potassium nitrate has a maximum working temperature of about 565° C., which temperature is not sufficient to generate super-critical steam at the heat exchanger for use as the turbine fluid. The useable temperature limits of molten salt mixtures are caused by crystallization at a lowermost temperature threshold and by salt decomposition at an uppermost temperature threshold. Although salts are known with decomposition temperatures that allow the temperature at the heat exchanger to rise beyond 565° C., salts having higher decomposition temperatures also have increased crystallization temperatures. An increase in the crystallization temperature results in an increased range of temperature for which the CSP system will not function because the working fluid will not flow around the system and is therefore not able to transfer energy from the solar receiver to the heat exchanger.

There is, therefore, a need for a means of transferring energy from a solar receiver, to a heat exchanger, over a wider range of temperature than is currently achievable using known arrangements of CSP systems.

SUMMARY OF DISCLOSURE

A first aspect of the present disclosure provides a solar power system comprising a solar receiver for absorbing solar radiation and a plurality of separate fluid flow paths passing through the solar receiver in parallel with each other, wherein each fluid flow path contains a working fluid flowable at at least a minimum operating temperature through the fluid flow path to absorb thermal energy from the solar receiver up to a maximum operating temperature, the minimum and maximum operating temperatures being different for each working fluid, the arrangement being such that thermal energy absorbed in the solar receiver by a working fluid having relatively lower minimum and maximum operating temperatures is transferred to a working fluid having relatively higher minimum and maximum operating temperatures in an adjacent fluid flow path, such transfer of thermal energy occurring before the working fluid with the relatively higher minimum and maximum operating temperatures absorbs thermal energy from the solar receiver.

For example, in a preferred embodiment, first and second fluid flow paths pass through the solar receiver, a first working fluid is flowable through the first fluid flow path to absorb thermal energy from the solar receiver up to a first maximum temperature; and a second working fluid is flowable through the second fluid flow path to absorb thermal energy from the solar receiver up to a second maximum temperature higher than the first maximum temperature.

As a further example, the solar power system may further comprise at least a third fluid flow path passing through the solar receiver and a third working fluid passable through the third fluid flow path to absorb thermal energy from the receiver up to a third maximum temperature higher than the first and second maximum temperatures.

Preferably, each fluid path includes a storage reservoir before the solar receiver and a storage reservoir after the solar receiver, whereby each working fluid is stored in a reservoir before and after heating in the solar receiver.

Conveniently, different working fluids may occupy first and second compartments of at least one of the storage reservoirs, the first compartment being located in a fluid flow path to store working fluid with relatively lower minimum and maximum operating temperatures after it has been heated in the solar receiver and the second compartment being located in a fluid flow path to store working fluid with relatively higher minimum and maximum operating temperatures before it is heated in the solar receiver, the first and second compartments of the storage reservoir being arranged such that during operation of the system the working fluid with the higher minimum operating temperature is maintained in a flowable condition by thermal energy from the working fluid with the lower minimum operating temperature.

In order to extract useable power from the system, each fluid flow path may include a heat exchanger through which in operation heated working fluid in that flow path passes to impart thermal energy to a turbine fluid, the heat exchangers being arranged in series with respect to flow of the turbine fluid such that a heat exchanger later in the series imparts further thermal energy to the turbine fluid after it has passed through a preceding heat exchanger. With water steam as the turbine fluid, this enables the steam to attain a supercritical state for increased efficiency of power generation. Such power generation may be achieved by passing the heated fluid through a turbine operating on the Rankine cycle, the turbine being arranged to drive an electrical generator.

In order to control the maximum temperature that each working fluid reaches through absorption of thermal energy from the solar receiver, the system may include pumps operable to pump the working fluids around the fluid flow paths at different flow rates.

A second aspect of the present disclosure provides a method of operating a solar power system, wherein thermal energy is transferred from a solar receiver to a plurality of different working fluids, the working fluids being flowable through a corresponding plurality of fluid flow paths and having different minimum and maximum operating temperatures from each other, the method comprising the steps of:

flowing the working fluids at at least their minimum operating temperatures through their respective fluid flow paths to absorb thermal energy from the solar receiver up to their maximum operating temperatures; and transferring thermal energy absorbed in the solar receiver by a working fluid having relatively lower minimum and maximum operating temperatures to a working fluid having relatively higher minimum and maximum operating temperatures in an adjacent fluid flow path, such transfer of thermal energy occurring before the working fluid with the relatively higher minimum and maximum operating temperatures absorbs thermal energy from the solar receiver.

Further aspects of the present disclosure will be apparent from a perusal of the following description and the appended claims.

BRIEF DESCRIPTION OF THE DRAWINGS

Exemplary embodiments will now be described with reference to the accompanying drawings, in which.

DETAILED DESCRIPTION OF EXEMPLARY EMBODIMENTS

Detailed descriptions of specific embodiments of a solar power generation system are disclosed herein. It will be understood that the embodiments in this disclosure are merely examples of the way in which the present concept can be implemented and do not represent an exhaustive account of all of the ways the concept may be embodied. Indeed, it will be understood that the solar power generation system described herein may be embodied in various and alternative forms. The figures are not to scale and well-known components, materials or methods are not described exhaustively in order to avoid obscuring the present concept with unnecessary detail. Any specific structural and functional details disclosed herein are not to be interpreted as limiting, but merely as a basis for the claims and as a representative basis for teaching one skilled in the art to variously employ the disclosure.

The present disclosure relates to the use of two or more different working fluids in a CSP generation system to enable a greater working range of temperatures than either working fluid can provide individually. The disclosed system provides for the generation of a sufficient temperature at the heat exchanger to create supercritical steam for use in a steam turbine, thereby allowing increased power generation efficiency.

To explain further, the skilled person will realize that as pressure increases, the boiling temperature of water increases and its latent heat of vapourization decreases. If pressure and temperature are increased sufficiently, the latent heat of vapourization becomes zero, i.e., water directly transitions to steam without boiling, which is the critical pressure and temperature. This occurs at 374° C. and 220.6 bar. Traditionally, steam power plants operate at steam pressures in the order of 170 bar, when the steam is in a subcritical state. However, greater thermal efficiencies can be achieved if power plants operate at pressures higher than the critical pressure. Such plants are known as supercritical power plants.

Figure 1:
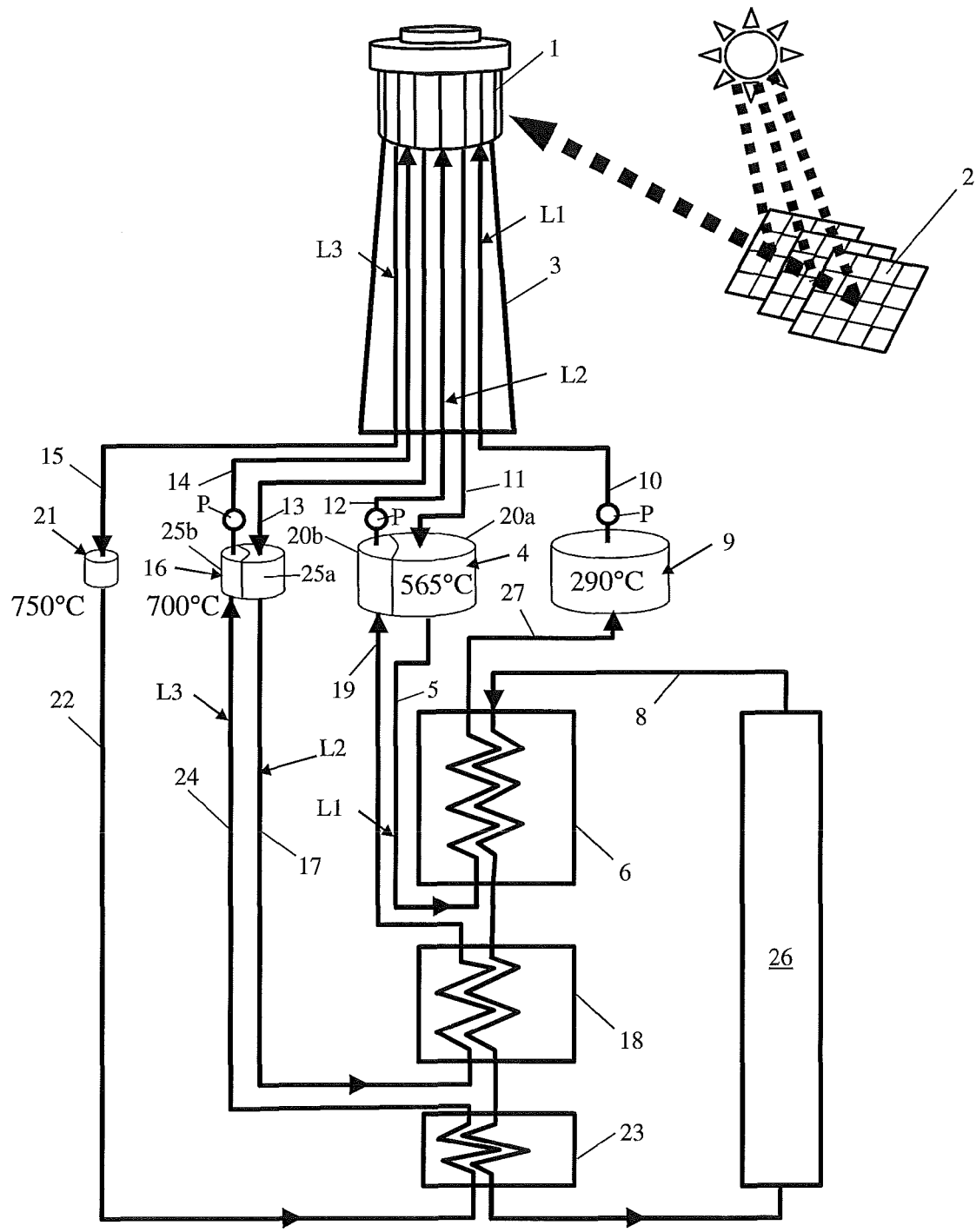
FIG. 1 is a schematic view of a solar power generation system according to an aspect of the present concept.

In the CSP system of FIG. 1, primarily though not solely for use in a supercritical power plant, suitably configured mirrors 2 are sized and arranged to focus solar radiation on a solar receiver 1 mounted atop a solar tower 3. The solar receiver 1 comprises solar radiation capturing elements that absorb incident solar radiation. CSP working fluid flows through passages in the solar receiver, thereby absorbing thermal energy from the solar radiation capturing elements and transporting it to other components of the system.

In FIG. 1, there are three closed circuit fluid flow paths or loops L1, L2, and L3, containing first second and third CSP working fluids, respectively.

In the first flow path L1, a first reservoir 9 contains the first working fluid and a duct 10 couples reservoir 9 to the solar receiver 1; a duct 11 couples the solar receiver 1 to a first compartment 20a in a second reservoir 4; a duct 5 couples the first compartment 20a in the second reservoir 4 to a first heat exchanger 6; and a duct 27 couples the first heat exchanger 6 to the first reservoir 9, thereby completing the closed circuit of the first flow path L1.

In the second flow path L2, a second compartment 20b of the second reservoir 4 contains the second working fluid and a duct 12 couples the second compartment 20b of the second reservoir 4 to the solar receiver 1; a duct 13 couples the solar receiver 1 to a first compartment 25a in a third reservoir 16; a duct 17 couples the first compartment 25a in the third reservoir 16 to a second heat exchanger 18; and a duct 19 couples the second heat exchanger 18 to the second compartment 20b of the second reservoir 4, thereby completing the closed circuit of the second flow path L2.

In the third flow path L3, a second compartment 25b of the third reservoir 16 contains the third working fluid and a duct 14 couples the second compartment 25b of the third reservoir 16 to the solar receiver 1; a duct 15 couples the solar receiver 1 to a fourth reservoir 21; a duct 22 couples the fourth reservoir 22 to a third heat exchanger 23; and a duct 24 couples the third heat exchanger 23 to the second compartment 25b of the third reservoir 16, thereby completing the closed circuit of the third flow path L3.

Turning now to a more detailed consideration of the CSP working fluid flow paths, duct 10 in fluid flow path L1 connects the solar receiver 1 to the first reservoir 9 containing the first CSP working fluid, e.g., a combination of 60% sodium nitrate and 40% potassium nitrate, which is held at a relatively low temperature (but above its crystallization temperature), ready for pumping through a pump P to the solar receiver 1. A suitable holding temperature for the molten salt in reservoir 9 is, e.g., 290° C. When the first CSP working fluid passes through the receiver 1, it absorbs thermal energy through a first set of passages in thermal communication with the radiation capturing elements and is heated to a temperature of, e.g., 565° C. before being pumped away from the receiver 1 through duct 11 to the primary compartment 20a of the second reservoir 4, where it is stored at that temperature. A duct 5 transports the first CSP working fluid from the second reservoir's primary compartment 20a to the first heat exchanger 6, where it gives up a large proportion of its thermal energy to a turbine working fluid in turbine fluid circuit 8. The turbine working fluid that enters heat exchanger 6 may be water or low grade steam, which is thereby raised in temperature and pressure. Duct 27 directs the first working fluid from the first heat exchanger 6 back to the first reservoir 9 at an appropriate temperature, e.g., 290° C., at which it is stored until pumped back to the receiver 1.

Duct 12 connects the receiver 1 to the secondary compartment 20b of the second reservoir 4. This secondary compartment 20b is isolated from the primary compartment 20a and stores the second CSP working fluid. Examples of suitable materials for use as this second working fluid are any one of: lithium fluoride/beryllium fluoride mixtures (LiF—BeF2), sodium tetrafluoroborate/sodium fluoride mixtures (NaBF4-NaF) and sodium fluoride/zirconium fluoride mixtures (NaF—ZrF4), each of which possesses higher upper and lower (i.e., decomposition and crystallization) temperature thresholds compared to the first working fluid. Preferably, the second reservoir 4 is isothermal, so that primary and secondary compartments 20a and 20b have similar or identical temperatures, thus avoiding the need to thermally insulate them from each other. Hence, the volume of the second working fluid stored in the secondary compartment 20b is maintained at substantially the temperature of the first working fluid stored in the primary compartment 20a, thus maintaining the second working fluid in compartment 20b at a temperature above its crystallization point. Consequently, the second working fluid is maintained in a useable state for pumping by a pump P from the secondary compartment 20b of the second reservoir 4 to the receiver 1, where it absorbs thermal energy to raise its temperature to, e.g., 700° C. After passing through a second set of passages in thermal communication with radiation capturing elements of the solar receiver 1 (the second set of passages being distinct from the first set through which the first working fluid passes) the second working fluid is pumped through duct 13 to the primary compartment 25a of the third reservoir 16, in which it is stored at the temperature to which it has been heated in the receiver 1. The primary compartment 25a of the third reservoir 16 communicates with a second heat exchanger 18, to which the second working fluid is pumped via duct 17. At the second heat exchanger 18, thermal energy is transferred from the second working fluid to turbine fluid that has already passed through the first heat exchanger 6, thereby further raising the temperature of the turbine fluid towards, the temperature of the second working fluid. The second working fluid is then returned to the secondary compartment 20b of the second reservoir 4 through duct 19, ready for recirculation through the solar receiver 1.

Compared with the prior art, it is advantageous to have a system having two different CSP working fluids, wherein the first working fluid passes through a first fluid flow path to absorb thermal energy from the receiver 1 up to a first maximum temperature and a second working fluid passes through a second fluid flow path to absorb thermal energy from the receiver up to a second maximum temperature that is substantially higher than the maximum temperature achieved by the first working fluid. In this way, sufficient thermal energy can be transferred to the turbine fluid in circuit 8 via the heat exchangers 6 and 18 to raise the turbine fluid (usually steam) to a supercritical state. Nevertheless, we contemplate that it may be worthwhile to further increase the high temperature ability of the system by introducing at least one more CSP working fluid capable of being raised to a yet higher temperature than the second CSP working fluid.

Referring again to FIG. 1, it will be seen that a duct 14 connects the receiver 1 to the secondary compartment 25b of the third reservoir 16. This secondary compartment 25b is physically (but preferably not thermally) isolated from the primary compartment 25a of the third reservoir 16 and stores a third CSP working fluid having higher upper and lower temperature thresholds compared with the second working fluid. Examples of materials suitable to provide this third working fluid are liquid metals, such as sodium or sodium potassium alloy, or a salt that is different from the salts chosen as the first and second working fluids. Thus, the third working fluid stored in the third reservoir's secondary compartment 25b is maintained at substantially the temperature of the second working fluid stored in the primary compartment 25a, i.e., the third working fluid is maintained at a temperature above its crystallization point, thereby maintaining it in a useable state for pumping by a pump P up to the receiver 1. The third working fluid is therefore pumped from the secondary compartment 25b of the third reservoir 16 to the receiver 1 and absorbs thermal energy to raise its temperature to, e.g., 750° C. After passing through a third set of passages in radiation capturing elements of the receiver 1 (the third set of passages being distinct from the first and second sets of passages through which the first and second working fluids respectively pass), the third working fluid is pumped through a duct 15 to a fourth reservoir 21, in which it is stored at the temperature to which it has been heated in the receiver 1. The fourth reservoir 21 communicates with a third heat exchanger 23, to which the third working fluid is pumped via a duct 22. In the third heat exchanger 23, the third working fluid transfers thermal energy to the turbine fluid that has already passed through the first and second heat exchangers 6, 18 thereby further raising the temperature of the turbine fluid. The third CSP working fluid is then returned through a duct 24 to the secondary compartment 25b of the third reservoir 16.

The turbine fluid, having flowed through the heat exchange circuits of each of the first, second and third heat exchangers 6, 18 and 23 sequentially, is preferably in a supercritical state, and is ducted from the third heat exchanger 23 to an inlet of a turbine 26, for driving a generator.

It is contemplated that the reservoirs themselves are highly insulated from their surroundings to prevent thermal energy losses to ambient that would detract from the overall system efficiency. The materials from which each compartment of the reservoirs is formed must be at least capable of withstanding the temperatures and reactivities of the respective working fluids after they have been heated in the receiver 1.

One way in which the maximum temperature of the individual working fluids may be controlled, as they pass from their respective reservoirs, through their respective passages in the receiver 1 and around the fluid circulation paths L1, L2, L3 back to their respective reservoirs, is by controlling their flow rates. This is possible because the three different working fluid circulation paths are independent of each other and thus have separate pumps and flow rates. Hence, the first working fluid may be pumped around the receiver 1 at a flow rate that allows it to absorb thermal energy up to, but not beyond, it's upper threshold temperature. The second working fluid may be pumped around the receiver at a second, lower, flow rate, thereby enabling a higher temperature to be reached. The third working fluid may then be pumped at a slower rate still around the receiver 1, so as to rise to higher temperatures than the second working fluid.

For start-up of the system, it is contemplated that if necessary the first CSP working fluid in reservoir 9 would be heated up to a working temperature from an external heat source. Then the first working fluid would be circulated around fluid path L1 until such time as the second reservoir 4 is sufficiently heated as to bring the second working fluid, stored in the secondary compartment 20b thereof, up to a sufficient temperature to enable it to flow. Similarly, the second working fluid will heat the third working fluid stored in the secondary compartment 25b of the third reservoir 16, and once this is sufficiently heated to enable flow, the third working fluid may also be employed. We thus provide an operational methodology in which the multiple working fluids are each employed only within their nominal temperature ranges. This provides a system that is adaptable to the degree of insolation being experienced, e.g., the second and third working fluids need only be employed where the meteorological conditions warrant it. Thus, in dim sunlight only the first working fluid might be used. Also, single or multiple reheat cycles can be implemented, as desired.

Although it is contemplated that with sufficient insolation of the receiver, the second working fluid in the above-described system will be raised to a temperature capable of heating water to a supercritical state, the skilled person will realize that the ducting system carrying the heated working fluids is not pressurized, thus only thermal stresses are present, leading to an expectation that the ducting will be more economical to manufacture compared to known supercritical boilers.

Figure 2:
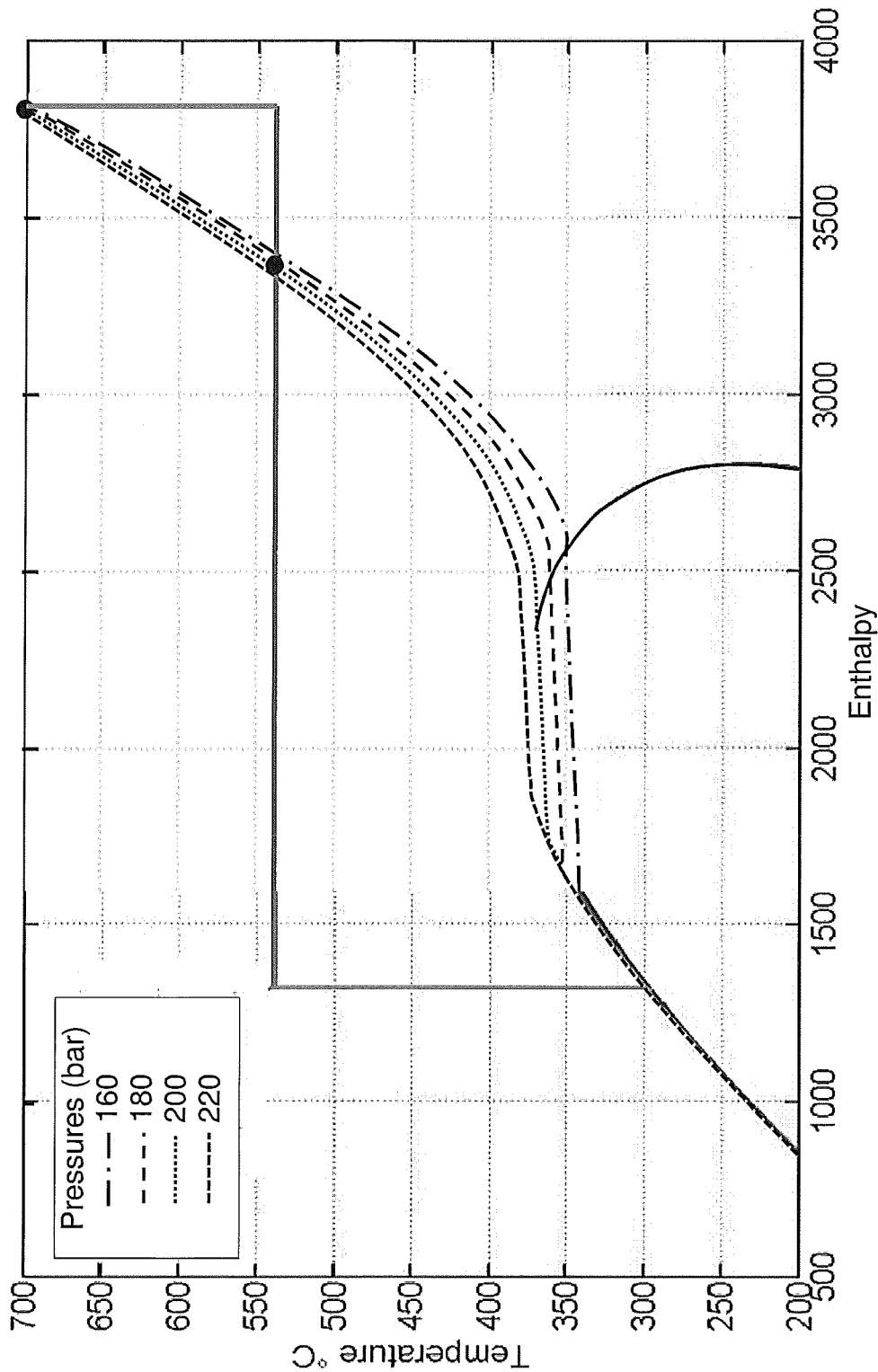
FIG. 2 is a graph plotting enthalpy against steam temperature from 200° C. to 700° C., for a range of pressures.

The effectiveness of a heat transfer and storage system, such as this one, that uses sensible heat, is proportional to the temperature difference between the cold and hot legs of each fluid path (Stored Energy=mass×heat capacity×temperature difference). In the example given in the present disclosure, the first working fluid will work from 290° C. to approximately 550° C. (therefor the change in temperature, DT=260° C.) while the second working fluid will work only from 550° C. up to approximately 700° C. (therefore DT=150° C.). Thus, for the second working fluid, the same amount of energy storage will require 1.7 times more volume (assuming the second working fluid has identical mass and heat capacity to the first working fluid). However, as illustrated in FIG. 2, when one considers the enthalpy requirements for heating pressurized water from 290° C. up to 700° C. in the heat exchangers 6 and 18 only of FIG. 1, it can be seen that the amount of energy required is not evenly distributed over the temperature range. Most of the energy required to raise the temperature of the water will be required in the 290° C. to 550° C. range, which is provided by the first, and more efficient, working fluid. The second working fluid is therefore used to raise the pressure of the water/steam to the supercritical state.

In alternative embodiments it is contemplated that only two, or more than three working fluids might be employed. As required, additional compartmentalised reservoirs, such as those described above, and respective heat exchangers, would be added or removed from the above embodiment to accommodate added or reduced numbers of working fluids.

Alternative working fluids may also be used, such as other forms of molten salts, liquid metals or gases such as, amongst others, carbon dioxide or helium.

It is also contemplated that more than one solar receiver may be incorporated into the system, with the working fluids being passed to the receivers in parallel or in series.

The invention claimed is:

1. A solar power system, comprising:
a solar receiver for absorbing solar radiation; and
a plurality of separate fluid flow paths each passing through the solar receiver in parallel, each separate fluid flow path containing a separate working fluid flowable at an at least minimum operating temperature through the separate fluid flow path to absorb thermal energy from the solar receiver up to a maximum operating temperature, the minimum and maximum operating temperatures differing for each separate working fluid, such that thermal energy absorbed in the solar receiver by a working fluid of relatively lower minimum and maximum operating temperatures is transferred to a working fluid of relatively higher minimum and maximum operating temperatures in an adjacent fluid flow path, with such transfer of thermal energy occurring before the working fluid with the relatively higher minimum and maximum operating temperatures absorbs thermal energy from the solar receiver;
wherein each separate fluid flow path includes a storage reservoir before the solar receiver and a storage reservoir after the solar receiver for storage of each working fluid before and after heating in the solar receiver; and
wherein different working fluids occupy first and second compartments of at least one of the storage reservoirs, the first compartment located in a fluid flow path to store working fluid with relatively lower minimum and maximum operating temperatures after heated in the solar receiver, and the second compartment located in a fluid flow path to store working fluid with relatively higher minimum and maximum operating temperatures before heated in the solar receiver, the first and second compartments of the storage reservoir arranged such that during operation of the system the working fluid with the higher minimum operating temperature is maintained in a flowable condition by thermal energy from the working fluid with the lower minimum operating temperature.

2. The solar power system of claim 1, wherein a first fluid flow path and a second fluid flow paths each pass through the solar receiver with a first working fluid flowable through the first fluid flow path to absorb thermal energy from the solar receiver up to a first maximum temperature,
and a second working fluid flowable through the second fluid flow path to absorb thermal energy from the solar receiver up to a second maximum temperature higher than the first maximum temperature.

3. The solar power system of claim 2, further comprising at least a third fluid flow path passing through the solar receiver with a third working fluid flowable through the third fluid flow path to absorb thermal energy from the solar receiver up to a third maximum temperature higher than the first and second maximum temperatures.

4. The solar power system of claim 1, wherein each fluid flow path includes a heat exchanger through which heated working fluid in that flow path passes to impart thermal energy to a turbine fluid, with each heat exchanger arranged in series with respect to flow of the turbine fluid such that each heat exchanger in the series imparts via its respective heated working fluid further thermal energy to the turbine fluid.

5. The solar power system of claim 1, comprising pumps operable to pump the working fluids around the fluid flow paths at different flow rates, to thereby control the maximum temperature of each working fluid through absorption of thermal energy from the solar receiver.

6. A method of operating a solar power system wherein thermal energy is transferred from a solar receiver to a plurality of different working fluids, each of the plurality of different working fluids flowable through a different fluid flow path, and each of the plurality of different working fluids having different minimum and maximum operating temperatures from those of the other plurality of different working fluids, the method comprising the steps of:
  a) flowing the plurality of different working fluids at an at least minimum operating temperatures of each through the respective fluid flow path of each to absorb thermal energy from the solar receiver up to their maximum operating temperatures of each; and
  b) transferring thermal energy absorbed in the solar receiver by a working fluid of relatively lower minimum and maximum operating temperatures to a working fluid of relatively higher minimum and maximum operating temperatures in an adjacent fluid flow path; wherein such transfer of thermal energy occurs before the working fluid with the relatively higher minimum and maximum operating temperatures absorbs thermal energy from the solar receiver;
  wherein each fluid flow path includes a storage reservoir before the solar receiver and a storage reservoir after the solar receiver for storage of each working fluid before and after heating in the solar receiver; and
  wherein different working fluids occupy first and second compartments of at least one of the storage reservoirs, the first compartment located in a fluid flow path to store working fluid with relatively lower minimum and maximum operating temperatures after heated in the solar receiver, and the second compartment located in a fluid flow path to store working fluid with relatively higher minimum and maximum operating temperatures before heated in the solar receiver, the first and second compartments of the storage reservoir arranged such that during operation of the system the working fluid with the higher minimum operating temperature is maintained in a flowable condition by thermal energy from the working fluid with the lower minimum operating temperature.

7. The method of claim 6, comprising flowing a first working fluid through a first fluid flow path to absorb thermal energy from the solar receiver up to a first maximum temperature, and flowing a second working fluid through a second fluid flow path to absorb thermal energy from the solar receiver up to a second maximum temperature higher than the first maximum temperature.

8. The method of claim 7, further comprising flowing at least a third working fluid through a third fluid flow path to absorb thermal energy from the solar receiver up to a third maximum temperature higher than the first and second maximum temperatures.

9. The method of claim 6, further comprising storing each working fluid in a storage reservoir before and after heating in the solar receiver.

10. The method of claim 9, further comprising:
  a) storing a working fluid with a lower minimum operating temperature in a storage reservoir before heating in the solar receiver;
  b) storing a working fluid with a higher minimum operating temperature in a storage reservoir after heating in the solar receiver; and
  c) transferring thermal energy from the working fluid with a lower minimum operating temperature to the working fluid with the higher minimum operating temperature during storage, to thereby maintain the working fluid with the higher minimum operating temperature in a flowable condition.

11. The method of claim 6, further comprising transferring thermal energy from a heated working fluid in each fluid flow path to a turbine fluid, wherein transfer of thermal energy to the turbine fluid from a working fluid having relatively higher minimum and maximum operating temperatures occurs after transfer of thermal energy to the turbine fluid from a working fluid having relatively lower minimum and maximum operating temperatures.

12. The method of claim 6, further comprising pumping the working fluids around the fluid flow paths at different rates, to thereby control the maximum temperature that each of the plurality of different working fluids reaches through absorption of thermal energy from the solar receiver.

13. The solar power system of claim 2, wherein each fluid flow path includes a storage reservoir before the solar receiver and a storage reservoir after the solar receiver, whereby each working fluid is stored in a reservoir before and after heating in the solar receiver.

14. The solar power system of claim 3, wherein each fluid flow path includes a storage reservoir before the solar receiver and a storage reservoir after the solar receiver, whereby each working fluid is stored in a reservoir before and after heating in the solar receiver.

15. The solar power system of claim 2, in which each fluid flow path includes a heat exchanger through which heated working fluid in that fluid flow path passes to impart thermal energy to a turbine fluid, the heat exchangers arranged in series with respect to flow of the turbine fluid such that each heat exchanger in the series imparts further thermal energy to the turbine fluid.

16. The solar power system of claim 3, in which each fluid flow path includes a heat exchanger through which heated working fluid in that fluid flow path passes to impart thermal energy to a turbine fluid, the heat exchangers arranged in series with respect to flow of the turbine fluid such that each heat exchanger imparts further thermal energy to the turbine fluid.

* * * * *